United States Patent
Sawada

(10) Patent No.: US 11,537,083 B2
(45) Date of Patent: Dec. 27, 2022

(54) ELECTRONIC TIMEPIECE

(71) Applicant: Seiko Epson Corporation, Tokyo (JP)

(72) Inventor: Akihiro Sawada, Matsumoto (JP)

(73) Assignee: SEIKO EPSON CORPORATION

( * ) Notice: Subject to any disclaimer, the term of this patent is extended or adjusted under 35 U.S.C. 154(b) by 819 days.

(21) Appl. No.: 16/386,329

(22) Filed: Apr. 17, 2019

(65) Prior Publication Data

US 2019/0324407 A1  Oct. 24, 2019

(30) Foreign Application Priority Data

Apr. 18, 2018  (JP) .............................. JP2018-079818
Dec. 20, 2018  (JP) .............................. JP2018-238069

(51) Int. Cl.
| | |
|---|---|
| G04C 10/00 | (2006.01) |
| G04C 10/02 | (2006.01) |
| G04B 19/24 | (2006.01) |
| H01Q 1/27 | (2006.01) |
| H01Q 9/04 | (2006.01) |
| G04G 21/04 | (2013.01) |

(52) U.S. Cl.
CPC ............ *G04C 10/02* (2013.01); *G04B 19/24* (2013.01); *G04G 21/04* (2013.01); *H01Q 1/273* (2013.01); *H01Q 9/0421* (2013.01)

(58) Field of Classification Search
CPC ........ G04G 21/04; G04B 19/24; G04C 10/02; G04R 60/00; G04R 60/02
See application file for complete search history.

(56) References Cited

U.S. PATENT DOCUMENTS

| | | | |
|---|---|---|---|
| 6,301,198 B1 * | 10/2001 | Otaka ................... | G04C 10/02 320/101 |
| 2009/0251997 A1 * | 10/2009 | Kimura .................. | G04C 3/146 343/788 |
| 2016/0161920 A1 | 6/2016 | Fujisawa et al. | |
| 2017/0018842 A1 * | 1/2017 | Sano .................... | H01Q 9/0407 |
| 2018/0351234 A1 * | 12/2018 | Yeom .................... | H01Q 1/243 |
| 2019/0324407 A1 * | 10/2019 | Sawada .................. | G04R 60/12 |
| 2020/0089170 A1 * | 3/2020 | Kitamura .............. | G04G 21/04 |
| 2020/0301371 A1 * | 9/2020 | Kitamura .............. | G04R 60/08 |

FOREIGN PATENT DOCUMENTS

| | | |
|---|---|---|
| JP | 2012-093211 A | 5/2012 |
| JP | 2016-109522 A | 6/2016 |
| JP | 2019-056616 A | 4/2019 |

* cited by examiner

*Primary Examiner* — Sean Kayes
(74) *Attorney, Agent, or Firm* — Harness, Dickey & Pierce, P.L.C.

(57) ABSTRACT

An electronic timepiece suppresses loss of power generating performance of a solar panel, and suppresses drop loss of antenna performance. The electronic timepiece has a pivot; a dial that transmits a light through which the pivot passes; an antenna having a radiating electrode through which the pivot passes; and a solar panel through which the pivot passes and which is disposed between the dial and the radiating electrode. The solar panel has a power generating part that converts light to electrical energy, and is disposed, in a plan view through the thickness direction of the dial, superimposed with the radiating electrode. Part or all of the outside circumference of the radiating electrode is disposed outside the power generating part in plan view.

9 Claims, 8 Drawing Sheets

ELECTRONIC TIMEPIECE

BACKGROUND

1. Technical Field

The present invention relates to an electronic timepiece.

2. Related Art

Electronic timepieces having an antenna for receiving satellite signals, and a solar cell that converts light energy to electrical energy, are known from the literature.

JP-A-2012-93211 describes an electronic timepiece having an antenna and a solar panel. The antenna has a radiating electrode and a ground electrode with a dielectric disposed therebetween. In this electronic timepiece, the radiating electrode is configured as a transparent electrode made of ITO (Indium Tin Oxide), for example, and the solar panel is disposed between the radiating electrode and the dielectric. This configuration enables light to pass through the radiating electrode to the solar panel, enabling photovoltaic generation. In addition, because the radiating electrode is between the solar panel and the crystal of the electronic timepiece, attenuation of satellite signals to the radiating electrode by the solar panel can be suppressed, and a drop in the reception performance of the radiating electrode can be suppressed.

However, because the radiating electrode is on the crystal side of the solar panel in the electronic timepiece described in JP-A-2012-93211, the amount of light incident to the solar panel is reduced by the radiating electrode even if the radiating electrode is configured as a transparent electrode. As a result, the performance of the solar panel decreases.

SUMMARY

An electronic timepiece according to a preferred aspect of the invention has a pivot; a dial that transmits a light through which the pivot passes; an antenna having a radiating electrode through which the pivot passes; and a solar panel through which the pivot passes and which is disposed between the dial and the radiating electrode. The solar panel has a power generating part that converts light to electrical energy, and is disposed, in a plan view through the thickness direction of the dial, superimposed with the radiating electrode so that part of the outside circumference of the radiating electrode is outside the power generating part.

Because light incident to the solar panel is not blocked by the radiating electrode as a result of the solar panel being disposed between the dial and the radiating electrode, reducing the power generating performance of the solar panel can be suppressed. In addition, because part or all of the outside circumference of the radiating electrode that functions as a signal radiating part is located outside the power generation part, decreasing antenna performance during both reception and transmission can be suppressed.

Preferably in an electronic timepiece according to another aspect of the invention, all of the outside circumference of the radiating electrode is positioned outside the power generating part in plan view.

This configuration can suppress a decrease in antenna performance because all of the outside circumference part of the radiating electrode is located outside the power generating part.

Preferably in an electronic timepiece according to another aspect of the invention, the power generating part is a first power generating part positioned inside the outside circumference of the radiating electrode in plan view; the solar panel has a second power generating part positioned outside the radiating electrode in plan view; and the first power generating part and the second power generating part are connected by leads.

Because this configuration has a first power generating part and a second power generating part, the area that contributes to power generation by the solar panel is greater than in a configuration that does not have a second power generating part, and this configuration can therefore improve the power generation performance of the solar panel.

Preferably in an electronic timepiece according to another aspect of the invention, the power generating part includes multiple solar cells; and a boost converter boosts a voltage produced by the power generating part.

This configuration enables efficiently extracting energy from the solar panel.

Preferably in an electronic timepiece according to another aspect of the invention, the antenna is an inverted-F antenna having a ground electrode separated from the radiating electrode, and a shorting element that shorts the radiating electrode to the ground electrode.

This configuration helps reduce the size of the electronic timepiece.

Preferably, an electronic timepiece according to another aspect of the invention also has a circuit board; and an electrode connecting the circuit board and the solar panel is disposed outside the shorting element in plan view.

This configuration reduces the chance of current flowing through the electrodes degrading the performance of the radiating electrode.

Preferably in an electronic timepiece according to another aspect of the invention, the antenna is a planar antenna.

This configuration helps make a thin electronic timepiece.

Preferably, an electronic timepiece according to another aspect of the invention also has an annular date indicator; and a date indicator holder to which the radiating electrode is disposed and which holds the date indicator.

This configuration can reduce the parts count of the electronic timepiece.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the invention are described below with reference to the accompanying figures. Note that the dimensions and scale of parts shown in the figures differ from the actual dimensions and scale. In addition, unless specifically stated below, the following description of preferred embodiments does not limit the scope of the invention as described in the accompanying claims.

Embodiment 1

Figure 1:
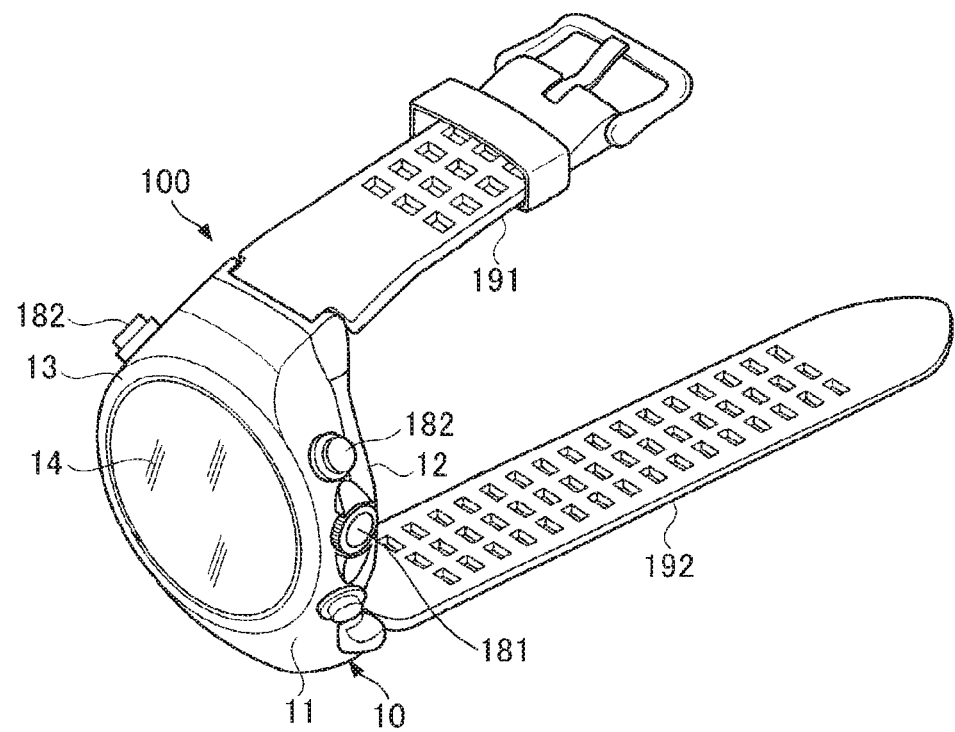
FIG. 1 is an oblique view of an electronic timepiece according to a first embodiment of the invention.
Figure 2:
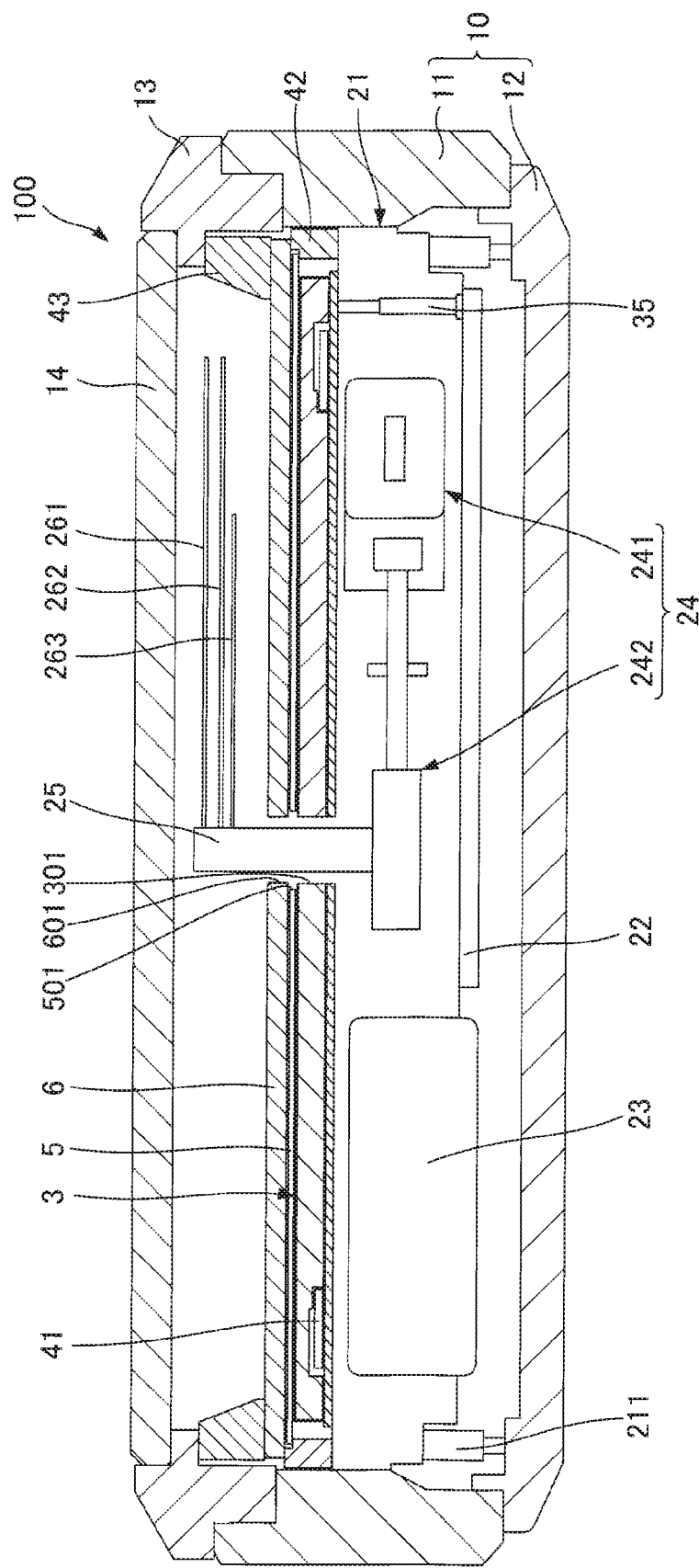
FIG. 2 is a section view of the electronic timepiece shown in FIG. 1.

FIG. 1 is an oblique view of an electronic timepiece according to a first embodiment of the invention. FIG. 2 is a section view of the electronic timepiece shown in FIG. 1.

The electronic timepiece 100 shown in FIG. 1 is configured as a wristwatch type device typically worn on the user's wrist. This electronic timepiece 100 has the functions of a wristwatch that adjusts the internal time by receiving satellite signals from GPS satellites, and the ability to calculate the current location using GPS time information and satellite orbit information.

As shown in FIG. 1, the electronic timepiece 100 has a case 10, an optically transparent, flat cover 14 attached to the case 10, and a pair of belts, belt 191 and belt 192, as members used to hold the electronic timepiece 100 on the user's wrist.

Note that below, the cover 14 side of the electronic timepiece 100 is referred to as the face side or top side, and the opposite side that is worn in contact with the user's wrist is referred to as the back side or the bottom side.

In addition, optically transparent herein means able for light enabling power generation to pass through to the solar panel 5 housed inside the case 10 described below (see FIG. 2). The cover 14 is also transparent to visible light so that the dial 6 housed inside the case 10 can be seen.

As shown in FIG. 2, the case 10 includes a cylindrical body 11, and a back cover 12 that closes one of the two main openings to the body 11. An annular bezel 13 is disposed on the face side of the body 11. The optically transparent, flat cover 14 is disposed on the inside circumference side of the bezel 13.

As shown in FIG. 1, a crown 181 and multiple buttons 182 are also disposed to the body 11. By operating these, the user can change the time and display of the electronic timepiece 100.

The materials used to make the body 11 and back cover 12 are not specifically limited, and may be plastic or stainless steel or other metal. The material used to make the cover 14 is also not specifically limited, and may be glass or plastic, for example.

Note also that the case 10 is configured with two members, the body 11 and back cover 12, in this example, but may be configured with three or more members or configured as a single member. The shape of the case 10 in plan view is also round in this example, but is not specifically limited and may be rectangular, for example.

As shown in FIG. 1, belt 191 and belt 192 are also removably attached to the body 11. The material used to make the belt 191 and belt 192 is also not specifically limited, and may be plastic or stainless steel or other metal.

As shown in FIG. 2, the electronic timepiece 100 includes a main plate 21, circuit board 22, storage battery 23, drive mechanism 24, pivot 25, multiple hands 261, 262, and 263, an antenna 3, a date indicator 41, solar panel 5, holding member 42, dial 6, and dial cover 43. These parts are held in the space formed by the cover 14, bezel 13, and case 10. Note that below the direction looking through the thickness of the dial 6 is referred to as the plan view.

The main plate 21 is pushed up and positioned in the sectional direction by a case ring 211. The main plate 21 is made from a material such as plastic. Multiple recesses for holding the storage battery 23 and drive mechanism 24 are also formed in the main plate 21.

The storage battery 23 is charged by power generated by the solar panel 5, and supplies power to the drive mechanism 24. The storage battery 23 is a lithium ion storage battery in this example.

The pivot 25 connects to the drive mechanism 24, and the pivot 25 can be driven rotationally by the drive mechanism 24. The drive mechanism 24 includes a stepper motor 241 as the drive source, and a wheel train 242 as a power transfer mechanism for transferring drive power from the stepper motor 241 to the pivot 25.

The pivot 25 protrudes from the main plate 21 toward the cover 14. The multiple hands 261, 262, and 263 for indicating the time are attached to the pivot 25. The hands 261, 262, and 263 are disposed on the cover 14 side of the dial 6, and rotate on the pivot 25.

The circuit board 22 is affixed by screws, for example, on the back side of the main plate 21. Included on the circuit board 22 are a CPU (Central Processing Unit), RAM (Random Access Memory), and RTC (real time clock), for example. The circuit board 22 also includes a control circuit for controlling driving the stepper motor 241, for example.

The antenna 3 is disposed on the face side of the main plate 21. The antenna 3 is used to receive satellite signals from GPS satellites in this example. The antenna 3 is also flat and round in plan view. In the middle of the antenna 3 in plan view is a through-hole 301 through which the pivot 25 passes.

Figure 3:
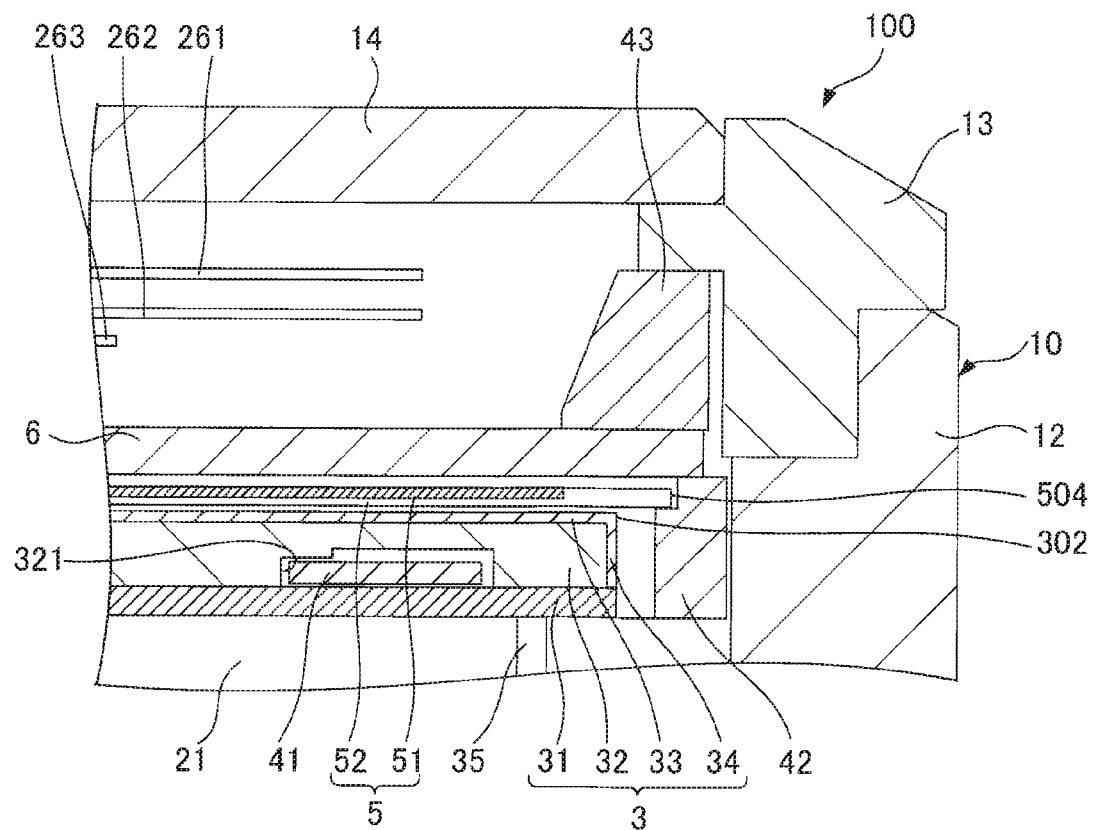
FIG. 3 is an enlarged view of part of the electronic timepiece shown in FIG. 2.

FIG. 3 is an enlarged view of part of the electronic timepiece shown in FIG. 2. In this embodiment the antenna 3 is more specifically configured as a flat inverted-F antenna, and as shown in FIG. 3 includes an antenna plate 31, dielectric 32, antenna pattern 33, and shorting element 34.

The antenna plate 31 is round. The antenna plate 31 is also conductive, and functions as the ground electrode. The antenna plate 31 also functions as a magnetic shield. More specifically, the antenna plate 31 also functions to protect the drive mechanism 24 from external magnetic fields. The antenna plate 31 is configured as a metal film of copper, gold, or nickel, for example, on a flat plate made of pure iron and a ferritic stainless steel.

A conductive feed pin 35 (feed node) is connected to the antenna pattern 33. The antenna pattern 33 and dielectric 32 are electrically connected by the feed pin 35.

The dielectric 32 is also round, and is positioned between the antenna plate 31 and antenna pattern 33. By using a dielectric 32, the size of the antenna 3 can be reduced by the wavelength shortening effect. The dielectric 32 is made from a member with a small dissipation factor, preferably a plastic member with a dissipation factor of $1 \times 10^{-4}$, for example. By using a member with a low dissipation factor, a drop in the performance of the antenna 3 can be suppressed.

A round recess 321 is formed in the bottom of the dielectric 32. An annular date indicator 41 is disposed in this recess 321, and the dielectric 32 functions as a date indicator holder. The date indicator 41 can be driven rotationally by a wheel train not shown (see FIG. 2). The dielectric 32 is also opaque, and has an opening for viewing part of the date indicator 41.

As shown in FIG. 3, the antenna pattern 33 above the dielectric 32, and is formed as a round thin film in plan view. The antenna pattern 33 is also superimposed on the antenna plate 31 in plan view. The antenna pattern 33 functions as a radiating electrode that determines the frequency of the antenna 3 and polarization of the received radio waves. The antenna pattern 33 is also made from a conductive material, and is configured as a metal film of copper, gold, or nickel, for example.

The shorting element 34 is disposed covering part of the side of the dielectric 32. More specifically, the shorting element 34 is disposed on the part of the side of the dielectric 32 at 12:00. Because the directivity of the antenna 3 is oriented to 9:00 by locating the shorting element 34 at the 12:00 position, the antenna 3 can receive signals more easily while the user is walking. The shorting element 34 is also connected to and shorts the antenna 3 and antenna pattern 33. The shorting element 34 is also made from a conductive member, and is configured as a metal film of copper, silver, or nickel, for example. More specifically, the shorting element 34 is configured in unison with the antenna pattern 33, extends from the antenna pattern 33 and wraps from the side to part of the bottom surface of the dielectric 32, and is conductively connected to the antenna plate 31 by a screw, for example. Note that the materials used to configure the shorting element 34 and antenna pattern 33 may be the same or different.

An annular holding member 42 that positions the solar panel 5 and holds the solar panel 5 is disposed outside the antenna 3. The holding member 42 also holds the dial 6 described below. The holding member 42 is fastened to the top of the main plate 21. The holding member 42 is also separated from the antenna 3. In this example, the holding member 42 is configured as a plastic member.

The solar panel 5 is a round solar panel, and converts light from the sun, for example, to electrical energy. The electrical energy produced by the solar panel 5 is stored in the storage battery 23. The solar panel 5 is located above the antenna 3, and in the center of the solar panel 5 in plan view is formed a through-hole 501 through which the pivot 25 passes (see FIG. 2). The through-hole 501 also communicates with the through-hole 301 in the antenna 3 described above.

Figure 4:
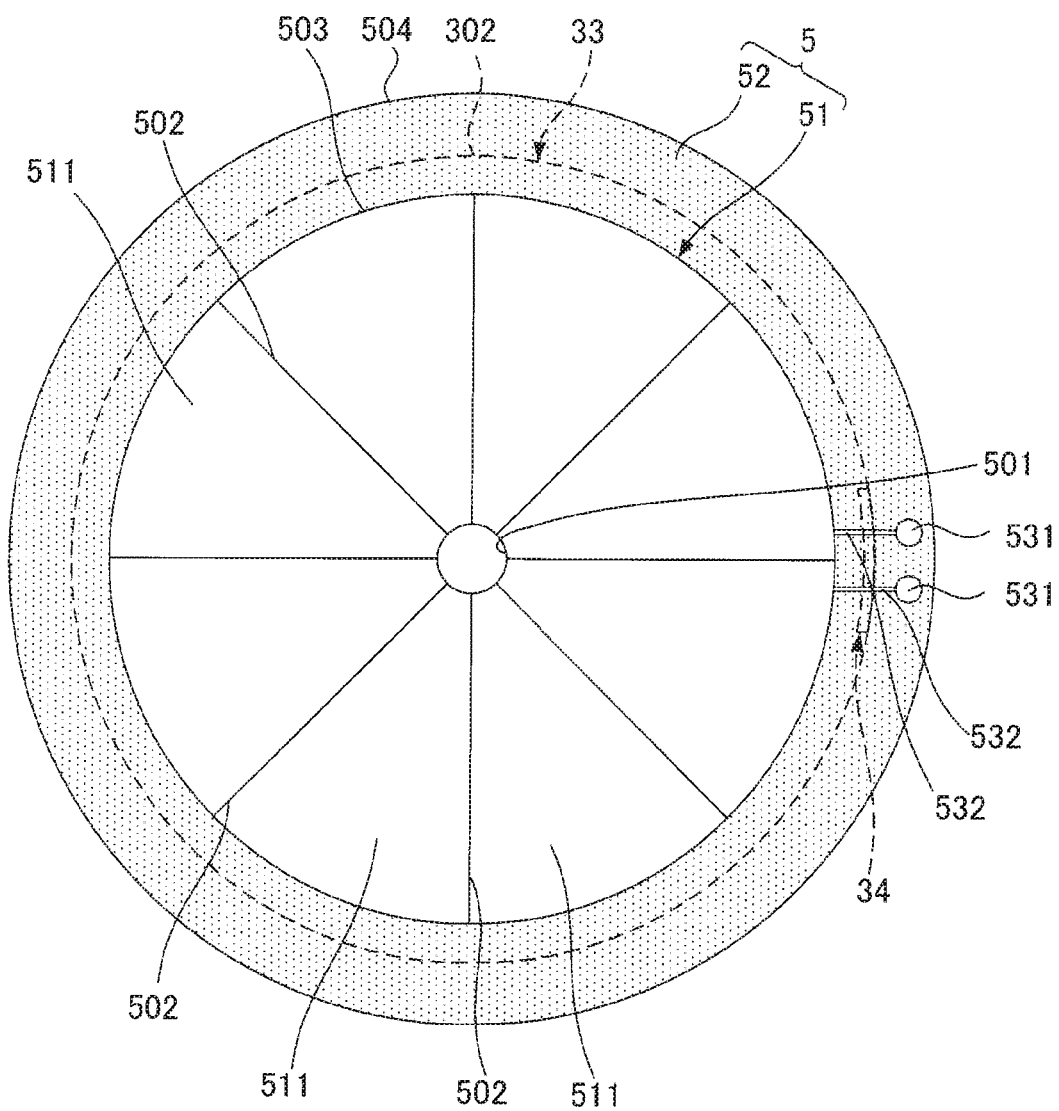
FIG. 4 is a plan view of the antenna pattern and the solar panel shown in FIG. 2.

FIG. 4 is a plan view of the solar panel 5 and antenna pattern 33 shown in FIG. 2. As shown in FIG. 4, the solar panel 5 includes a power generating part 51 that contributes to power generation by the solar panel 5, and a non-generating part 52 that does not contribute to power generation by the solar panel 5. Note that the non-generating part 52 is indicated by a dotted line in FIG. 4 to more easily understand the location of the non-generating part 52.

The power generating part 51 comprises multiple solar cells 511 separated by multiple divider lines 502 extending from the through-hole 501 toward the outside circumference 504 side. Note that the number of solar cells 511 in this example is eight, and the multiple solar cells 511 are connected in series. The solar cells 511 are also formed in the order of, for example, a plastic base, metal electrode layer, semiconductor layer, transparent electrode layer, and protective layer from the antenna pattern 33 side. The semiconductor layer comprises a p-type semiconductor and an n-type semiconductor with an i-type semiconductor therebetween. Note that the configuration of the solar cells 511 is not limited to the foregoing.

The non-generating part 52 surrounds the power generating part 51 in plan view. The non-generating part 52 does not have the metal electrode and transparent electrode of the solar cells 511, and passes the signals received by the antenna 3. More specifically, the non-generating part 52 is formed in the order of, for example, a plastic base, semiconductor layer, and protective layer from the antenna pattern 33 side. Note also that the non-generating part 52 is not limited to this structure, and the semiconductor layer may be omitted, for example.

Multiple electrodes 531 for extracting energy produced by the non-generating part 52 are also disposed to the non-generating part 52, and are connected to the circuit board 22 through lead terminals not shown. The electrodes 531 are connected to the power generating part 51 by connectors 532. The electrodes 531 are also located outside the antenna pattern 33 in plan view.

As shown in FIG. 4, the size of the solar panel 5 in plan view is larger than the size of the antenna pattern 33 in plan view, and the solar panel 5 encompasses the antenna pattern 33 in plan view. The outside circumference 504 of the solar panel 5 is therefore located outside the outside circumference 302 of the antenna pattern 33 in plan view.

The size of the power generating part 51 of the solar panel 5 in plan view is smaller than the antenna pattern 33 in plan view, and the antenna pattern 33 therefore encompasses the power generating part 51 in plan view. The outside circumference 302 of the antenna pattern 33 is therefore located outside the outside circumference 503 of the power generating part 51 in plan view.

As also shown in FIG. 3, the round dial 6 is disposed above the solar panel 5. The dial 6 is fixed on the top surface of the holding member 42, and is separated from the solar panel 5. In the center of the dial 6 in plan view is a through-hole 601 through which the pivot 25 passes (see FIG. 2). This through-hole 601 also communicates with the through-hole 501 in the solar panel 5.

The dial 6 is made from a plastic material, such as polycarbonate, that is optically transparent and electrically non-conductive. A date window for viewing part of the date indicator 41 is disposed in the dial 6 at a position corresponding to the opening formed in the dielectric 32 described above.

As shown in FIG. 3, an annular dial cover 43 is disposed on top of the dial 6. The dial cover 43 is disposed to cover the outside circumference 504 of the solar panel 5 in plan view. The material used for the dial cover 43 is not specifically limited, but is preferably a plastic material that can reduce or prevent blocking the signals the antenna 3 receives, for example.

As described above, the electronic timepiece 100 according to this embodiment has a pivot 25, an optically transparent dial 6 through which the pivot 25 passes, an antenna 3 with an antenna pattern 33 as the radiating electrode through which the pivot 25 passes, and a solar panel 5 that is disposed between the dial 6 and antenna pattern 33, and through which the pivot 25 passes, as shown in FIG. 2 and FIG. 3. As shown in FIG. 4, the solar panel 5 has a power generating part 51 that is superimposed in plan view over the entire antenna pattern 33 when seen from the thickness direction of the dial 6, and converts light to electrical energy. The outside circumference 302 of the antenna pattern 33 is located outside the power generating part 51 in plan view.

By disposing the solar panel 5 between the dial 6 and antenna pattern 33 in this electronic timepiece 100 as shown in FIG. 3, incidence of light on the solar panel 5 is not blocked by the antenna pattern 33, and a drop in the generating performance of the solar panel 5 can be suppressed.

In addition, the strongest radio waves are radiated by this antenna 3 from the outside circumference 302 of the antenna pattern 33 to the space outside. More specifically, the outside circumference 302 of the antenna pattern 33 functions as the radiating part that radiates the strongest signals. As a result, because the outside circumference 302 of the antenna pattern 33 is located outside the power generating part 51 as shown in FIG. 4, a drop in the performance of the antenna 3 can be suppressed.

More specifically, because the satellite signals received from GPS satellites are high frequency signals, the radio waves are easily attenuated by the power generating part 51 comprising a metal electrode including metal materials and a transparent electrode, and the performance of the antenna 3 drops easily. However, a drop in antenna 3 performance can be effectively reduced by disposing the outside circumference 302 of the antenna pattern 33 outside the power generating part 51.

By using a antenna pattern 33 through which the pivot 25 passes, there is no need to dispose the antenna 3 to avoid the pivot 25, and the plane area of the antenna pattern 33 can be increased. In addition, by using a solar panel 5 through which the pivot 25 passes, there is no need to dispose the solar panel 5 to avoid the pivot 25, and the power generating performance of the solar panel 5 can be increased.

As shown in FIG. 4, the power generating part 51 is also located inside the outside circumference 302 of the antenna pattern 33 in plan view.

This arrangement positions all of the outside circumference 302 of the antenna pattern 33 outside the power generating part 51 in plan view, and can therefore effectively reduce a drop in the performance of the antenna pattern 33.

Note that if at least part of the outside circumference 302 of the antenna pattern 33 is located outside the power generating part 51 in plan view, a drop in the performance of the antenna 3 can be suppressed better than when the entire outside circumference 302 is superimposed in plan view with the power generating part 51.

Yet further, by disposing the power generating part 51 in substantially the entire area inside the outside circumference 302 of the antenna pattern 33 as shown in FIG. 4, good power generating performance can be obtained with the solar panel 5 without impairing the performance of the antenna 3. As a result, the transmittance of the dial 6 can be reduced to improve the external appearance.

Yet further, because the outside circumference 504 of the solar panel 5 is covered in plan view by the dial cover 43 as shown in FIG. 3, the border between the holding member 42 and solar panel 5 does not need to be located in the area on the inside circumference side of the dial cover 43. As a result, a uniform appearance of the inside of the electronic timepiece 100 visible through the cover 14 can be achieved, and the aesthetic appeal of the electronic timepiece 100 can be improved.

The distance between the outside circumference of the antenna pattern 33 and the outside circumference of the power generating part 51 in plan view can be set appropriately to reduce the effect on the performance of the antenna 3. More specifically, the distance between the outside circumference 503 of the power generating part 51 and the antenna pattern 33 is approximately 0.5 mm in this example.

As shown in FIG. 4, the electrodes 531 are also located outside the antenna pattern 33 and outside the shorting element 34 in plan view. By disposing the electrodes 531 outside of the shorting element 34, the chance of current flowing through the lead terminals connecting the electrodes 531 to the circuit board 22 causing a drop in the performance of the antenna 3 can be reduced.

Furthermore, as also shown in FIG. 4, because a metal layer crossing the outside circumference 302 of the antenna pattern 33 is not present anywhere other than at the connectors 532 in plan view, the decrease in the performance of the antenna 3 due to a metal layer shielding the outside circumference 302 of the antenna pattern 33 can be minimized.

Furthermore, because the antenna 3 is flat, there may be an overlap in plan view between the solar panel 5, antenna 3, storage battery 23, and drive mechanism 24 as shown in FIG. 2. As a result, the thinness of the electronic timepiece 100 can be improved.

In addition, the storage battery 23 and drive mechanism. 24 do not need to be located to avoid the antenna 3 so there is no overlap with the antenna 3, the locations of the storage battery 23 and drive mechanism 24 can be determined more freely.

As described above, the antenna 3 is an inverted-F antenna that has an antenna plate 31 as a ground electrode separated from the antenna pattern 33 with the antenna pattern 33 and antenna plate 31 shorted by a shorting element 34.

By using an inverted-F antenna as the antenna 3, excessively increasing the thickness of the electronic timepiece 100 can be prevented even if the solar panel 5 and antenna pattern 33 are superimposed with each other in plan view as described above.

As also described above, the antenna plate 31 of the antenna 3 also functions as a magnetic shield. As a result, the drive mechanism 24 can be protected from external magnetic fields without using a separate magnetic shield. Because providing a separate magnetic shield is not necessary, the parts count of the electronic timepiece 100 can also be reduced. This also helps improve the thinness of the electronic timepiece 100.

As also described above, the dielectric 32 also functions as the date indicator holder. Because providing a separate date indicator holder is also not necessary, the parts count of the electronic timepiece 100 can be further reduced. This also helps improve the thinness of the electronic timepiece 100.

An electronic timepiece 100 according to the invention is described above. This electronic timepiece 100 provides a configuration balancing antenna 3 performance and solar panel 5 generating performance with the appearance of the electronic timepiece 100 and a small, thin electronic timepiece 100 design.

Note that if the electronic timepiece 100 has at least a dial 6, pivot 25, antenna pattern 33, and solar panel 5, other elements may be omitted as desired or replaced with other parts having the same function.

Furthermore, the antenna plate 31 also functions as a magnetic shield but does not need to provide this functionality. For example, an electrode pattern that functions as the antenna plate 31 may be disposed on the bottom of the dielectric 32. A separate magnetic shield may also be provided.

Yet further, the dielectric 32 functions as a date indicator holder in the configuration described above, but does not need to provide this functionality. For example, a date indicator holder separate from the dielectric 32 may be provided. The dielectric 32 may also be configured by a main plate, for example.

The antenna 3 in the above example is an inverted-F antenna, but another type of planar antenna having the ground plane and antenna electrodes in a substantially parallel configuration may be used as the antenna. By using a planar antenna, the thickness of the antenna 3 can be reduced and the thinness of the electronic timepiece 100 can be improved. For example, because GPS satellites transmit satellite signals as right-hand circularly polarized waves, a microstrip antenna (patch antenna) with excellent circular polarization characteristics can also be used as a planar antenna for receiving GPS satellite signals.

The shorting element 34 is disposed to a side of the dielectric 32 at 12:00 in the above example, but the location of the shorting element 34 is not so limited.

The circuit board 22 described above may also be configured with a boost converter.

Yet further, the solar panel 5 in the embodiment described above is superimposed in plan view with the entire antenna pattern 33, but the solar panel 5 may be disposed superimposed in plan view with only part of the antenna pattern 33.

Embodiment 2

Figure 5:
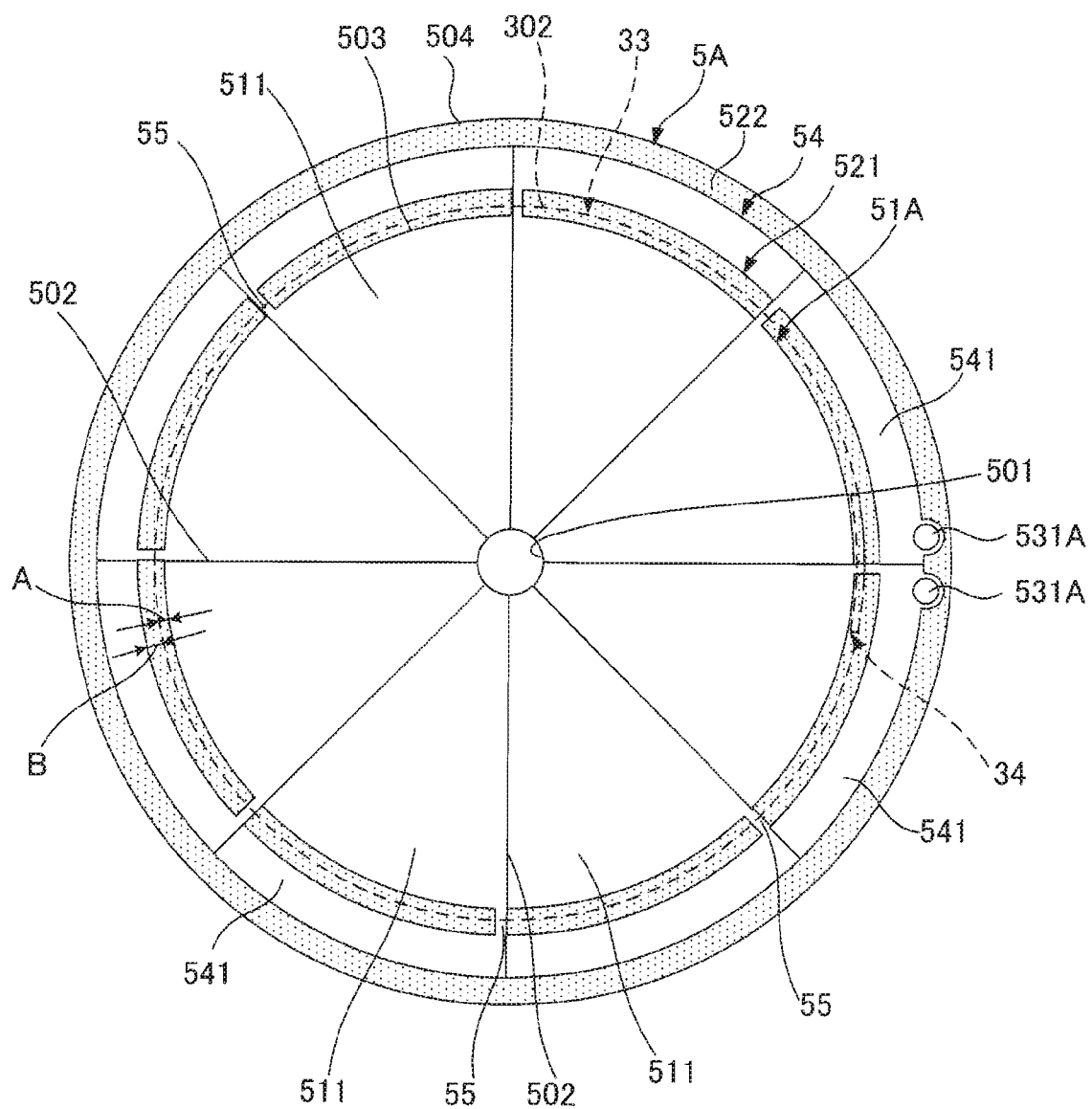
FIG. 5 is a plan view of the solar panel and antenna pattern in an electronic timepiece according to a second embodiment of the invention.

A second embodiment of the invention is described next. FIG. 5 is a plan view of the solar panel and antenna pattern in an electronic timepiece according to a second embodiment of the invention.

This embodiment is the same as the first embodiment described above other than the configuration of the solar panel. The following description of the second embodiment focuses on the differences with the embodiment described above, and further description of like parts is omitted. Like parts in this embodiment and the embodiment described above are also identified by the same reference numerals in FIG. 5.

The solar panel 5A shown in FIG. 5 has a first power generating part 51A, a second generating part 54, a first non-generating part 521, a second non-generating part 522, and multiple leads 55. Note that in FIG. 5 the first non-generating part 521 and second non-generating part 522 are indicated by a dotted pattern.

The first power generating part 51A is configured identically to the power generating part 51 in the first embodiment. More specifically, the first power generating part 51A comprises multiple solar cells 511.

The size of the first power generating part 51A in plan view is smaller than the antenna pattern 33 in plan view, and the outside circumference 302 of the antenna pattern 33 is located outside the outside circumference 503 of the first power generating part 51A in plan view.

The first non-generating part 521 encompasses the first power generating part 51A in plan view, and is configured the same as the non-generating part 52 in the first embodiment.

The second generating part 54 is a part that contributes to power generation by the solar panel 5. In plan view, the second generating part 54 surrounds the first non-generating part 521, and is located between the first non-generating part 521 and second non-generating part 522 in plan view.

The second generating part 54 comprises multiple solar cells 541. The number of solar cells 541 in the example in the figure is eight. The second generating part 54 are separated by multiple divider lines 502. The multiple solar cells 541 are connected in series together with the multiple solar cells 511. The solar cells 541 are also formed in the order of, for example, a plastic base, metal electrode layer, semiconductor layer, transparent electrode layer, and protective layer from the antenna pattern 33 side. The semiconductor layer comprises a p-type semiconductor and an n-type semiconductor with an i-type semiconductor therebetween.

The second non-generating part 522 is a part that does not contribute to power generation by the solar panel 5A. The second non-generating part 522 surrounds the second generating part 54 in plan view. Like the first non-generating part 521, the second non-generating part 522 does not have electrodes, and enables radio waves received by the antenna 3 to pass through. Like the first non-generating part 521, the second non-generating part 522 is formed in the order of, for example, a plastic base, semiconductor layer, and protective layer from the antenna pattern 33 side.

The distance A in plan view between the outside circumference 302 of the antenna pattern 33 and the outside circumference 503 of the first power generating part 51A, and the distance B in plan view between the outside circumference 302 of the antenna pattern 33 and the inside circumference of the second generating part 54, may be set appropriately to minimize the effect on the performance of the antenna 3. More specifically, in this example distance A is approximately 0.5 mm, and distance B is approximately 1.0 mm.

The multiple leads 55 are bridges that connect the first power generating part 51A and second generating part 54. More specifically, the leads 55 electrically connect one solar cell 511 with the one adjacent solar cell 541.

Part of the electrodes 531A is disposed inside of the outside circumference of the second generating part 54.

In this embodiment as described above, the generating part is the first power generating part 51A located inside the outside circumference 302 of the antenna pattern 33 in plan view. In addition, the solar panel 5A has a second generating part 54 located in plan view outside the antenna pattern 33. The first power generating part 51A and the second generating part 54 are electrically connected by leads 55.

Because this embodiment of the invention has a first power generating part 51A and second generating part 54, the area that contributes to power generation by the solar panel 5A is larger than in a configuration that does not have a second generating part 54. As a result, the power generating performance of the solar panel 5A can be improved.

Furthermore, because the first power generating part 51A is inside the outside circumference 302 of the antenna pattern 33, and the second generating part 54 is located outside the antenna pattern 33, the antenna pattern 33 is not superimposed in plan view with the first power generating part 51A and second generating part 54. As a result, a drop in the performance of the antenna 3 can be suppressed.

Furthermore, because a metal layer crossing the outside circumference 302 of the antenna pattern 33 is not present anywhere other than at the leads 55 in plan view, the decrease in the performance of the antenna 3 due to a metal layer shielding the outside circumference 302 of the antenna pattern 33 can be minimized.

In addition, the number of leads 55 can be easily decreased by reducing the number of solar cells 511 and solar cells 541. By reducing the number of leads 55, the effect on the performance of the antenna 3 can also be further reduced. As a result, the circuit board 22 may be configured with a boost converter.

Because a boost converter can be disposed to the circuit board 22 even when the number of solar cells 511 and solar cells 541 is reduced, energy can be efficiently extracted from the solar panel 5A. For example, if the number of solar cells 511 and solar cells 541 is reduced from eight to four, and there is a 2×voltage boost, energy loss from the solar panel 5A can be prevented and the number of leads 55 can be reduced by half.

The second embodiment described above can also suppress a drop in the power generation performance of the solar panel 5A, and suppress a drop in the performance of the antenna 3.

Embodiment 3

Figure 6:
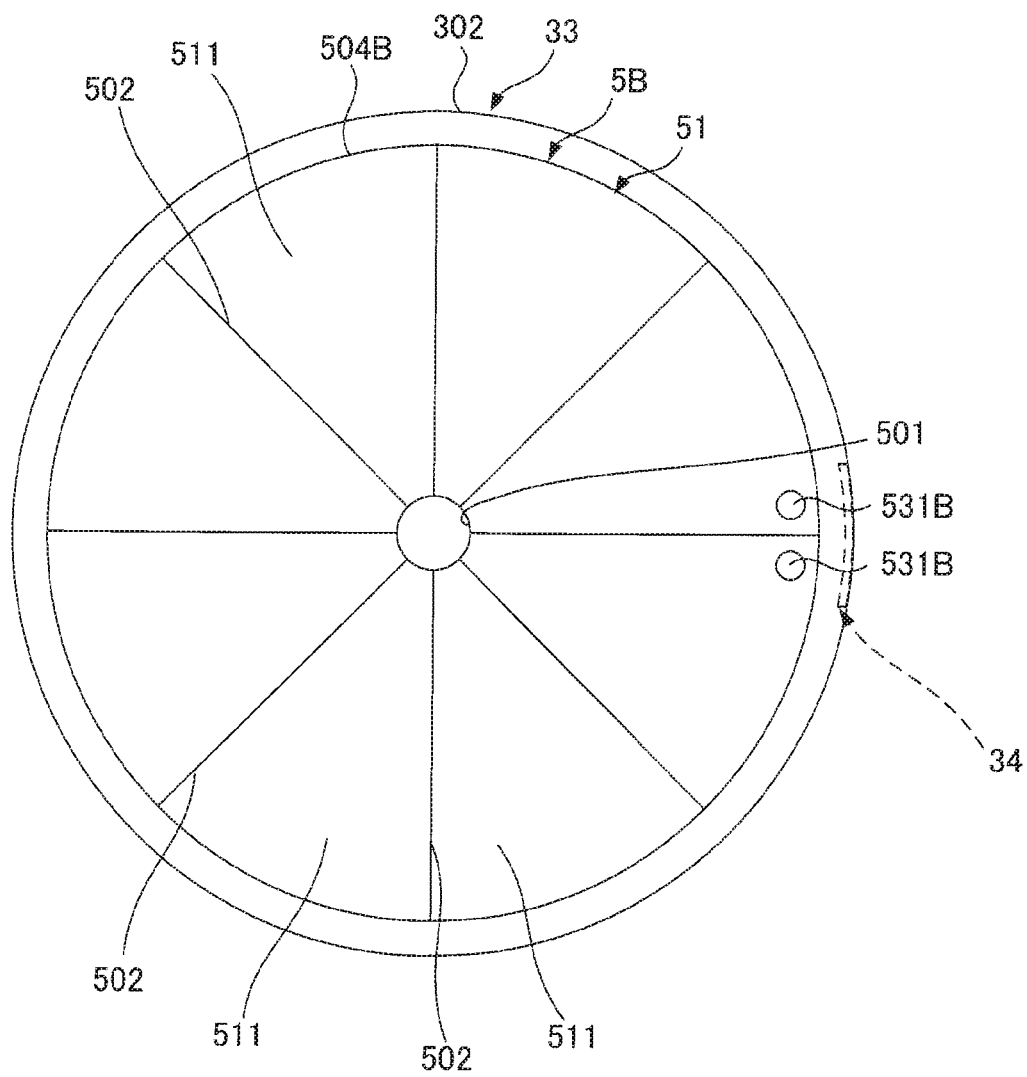
FIG. 6 is a plan view of the solar panel and antenna pattern in an electronic timepiece according to a third embodiment of the invention.
Figure 7:
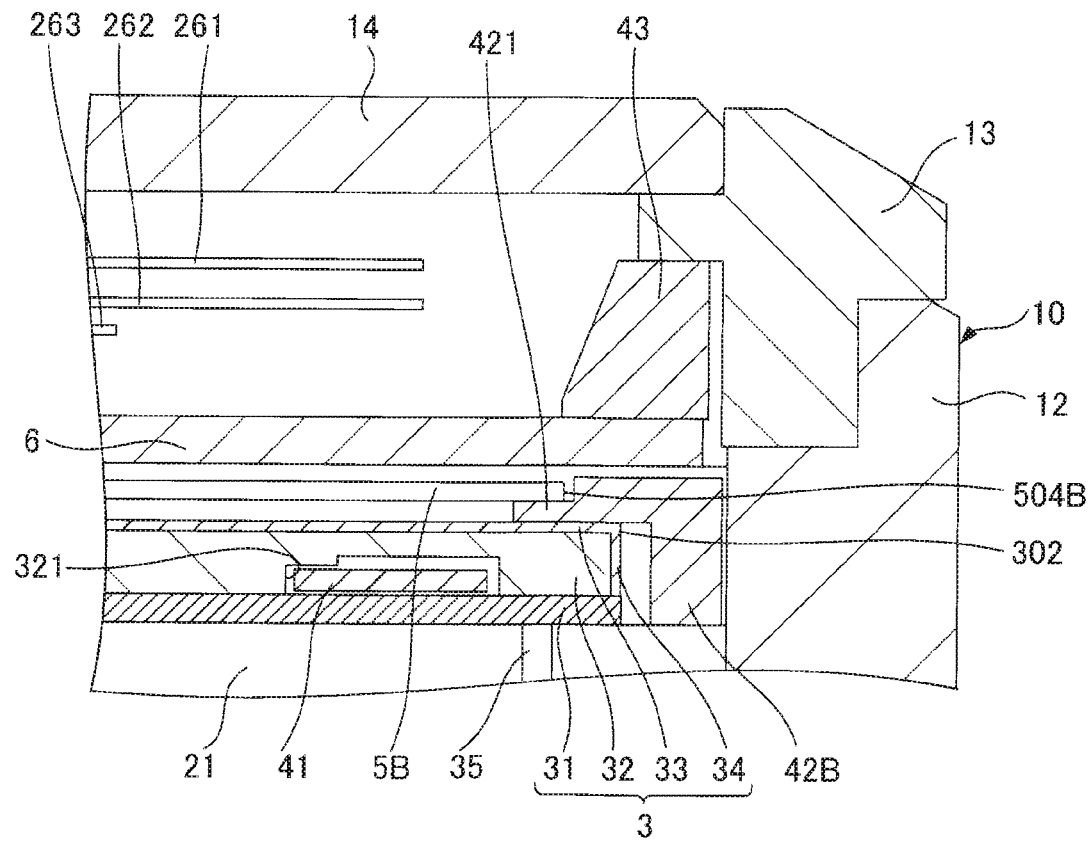
FIG. 7 is an enlarged view of part of the electronic timepiece according to the third embodiment of the invention.

A third embodiment of the invention is described next. FIG. 6 is a plan view of the solar panel and antenna pattern in an electronic timepiece according to a third embodiment of the invention. FIG. 7 is an enlarged view of part of the electronic timepiece according to the third embodiment of the invention.

This embodiment is the same as the first embodiment described above other than the configuration of the solar panel and the configuration of the holding member. The following description of the third embodiment focuses on the differences with the embodiments described above, and further description of like parts is omitted. Like parts in this embodiment and the embodiments described above are also identified by the same reference numerals in FIG. 6 and FIG. 7.

As shown in FIG. 6, the solar panel 5B has a power generating part 51, but does not have the non-generating part 52 of the first embodiment.

The size of the solar panel 5B in plan view is smaller than the antenna pattern 33 in plan view, and the solar panel 5B is encompassed by the antenna pattern 33 in plan view. Therefore, the outside circumference 504B of the solar panel 5B, that is, the outside circumference of the power generating part 51, is located inside the outside circumference 302 of the antenna pattern 33 in plan view.

The electrodes 531B do not have connectors 532 as in the first embodiment, and instead are disposed inside the outside circumference of the power generating part 51.

As shown in FIG. 7, the holding member 42B that supports the solar panel 5B has a part 421 disposed between the solar panel 5B and antenna 3. The holding member 42B is preferably made of plastic to reduce or prevent interference with the signals the antenna 3 receives.

Because the solar panel 5B is encompassed by the antenna pattern 33 in plan view in this embodiment as described above, the solar panel 5B is not disposed above the antenna pattern 33. As a result, the effect of the solar panel 5B on the performance of the antenna 3 can be reduced or prevented.

The third embodiment described above can also suppress a drop in the power generation performance of the solar panel 5, and suppress a drop in the performance of the antenna 3.

Embodiment 4

Figure 8:
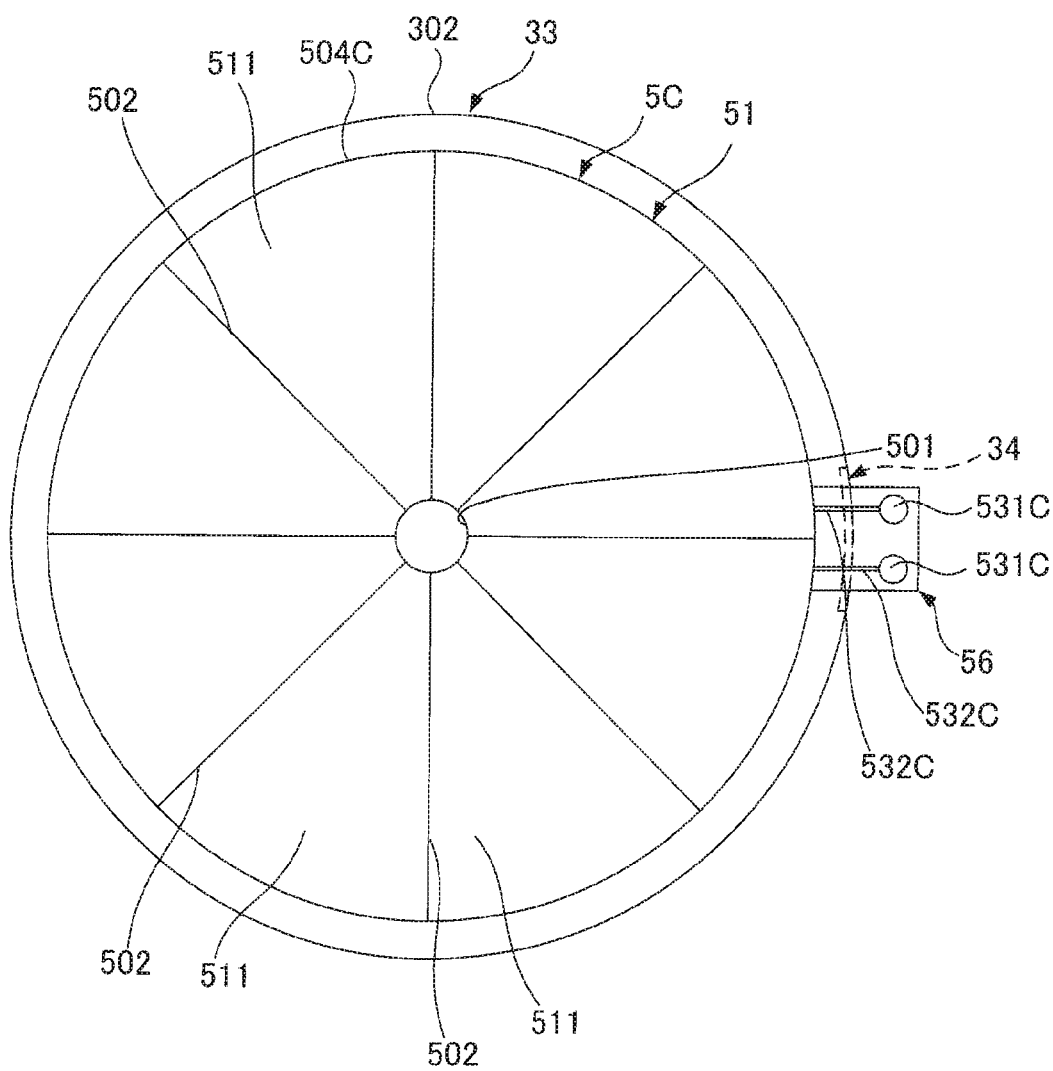
FIG. 8 is a plan view of the solar panel in an electronic timepiece according to a fourth embodiment of the invention.

A fourth embodiment of the invention is described next. FIG. 8 is a plan view of the solar panel in an electronic timepiece according to a fourth embodiment of the invention.

This embodiment is the same as the third embodiment described above other than the configuration of the solar panel. The following description of the fourth embodiment focuses on the differences with the embodiments described above, and further description of like parts is omitted. Like parts in this embodiment and the embodiments described above are also identified by the same reference numerals in FIG. 8.

The solar panel 5C shown in FIG. 8 has a power generating part 51, and a protruding part 56 that protrudes from the power generating part 51. The protruding part 56 is a part that does not contribute to power generation by the solar panel 5. The protruding part 56 in this example has a plastic base and a protective layer.

Multiple electrodes 531C are disposed to the protruding part 56. The electrodes 531C are connected to the power generating part 51 by connectors 532C. Because a metal layer crossing the outside circumference 302 of the antenna pattern 33 in plan view is not present anywhere other than at the connectors 532C, the decrease in the performance of the antenna 3 due to a metal layer shielding the outside circumference 302 of the antenna pattern 33 can be minimized.

The electrodes 531C are also outside the antenna pattern 33 and outside the shorting element 34 in plan view. Because the electrodes 531C is located outside the shorting element 34, the chance of current flowing through the lead terminals connecting the electrodes 531C to the circuit board 22 causing a drop in the performance of the antenna 3 can be reduced.

Furthermore, as in the third embodiment, the outside circumference 504 of the solar panel 5C in this embodiment, that is, the outside circumference of the power generating part 51, is inside the outside circumference 302 of the antenna pattern 33 in plan view.

The fourth embodiment described above can also suppress a drop in the power generation performance of the solar panel 5A, and suppress a drop in the performance of the antenna 3.

Preferred embodiments of an electronic timepiece according to the invention are described above, but the invention is not so limited. The configurations of parts of the invention can also be replaced with other desirable configurations having the same functions as the configurations described above, and other desirable configurations may also be added.

The antenna in the foregoing embodiments is described as a GPS antenna capable of receiving GPS satellite signals, but if the antenna has a radiating electrode, the antenna is not limited to a GPS antenna. For example, the antenna may be any antenna capable of receiving satellite signals from Galileo (EU), GLONASS (Russia), Beidou (China), or other positioning information satellites, or an antenna capable of receiving satellite signals from SBAS or other geostationary satellites, or quasi-zenith satellites. The antenna may also be an antenna for receiving Bluetooth(R) or other wireless near-field communication signals.

The non-generating part 52 is also described as a laminated configuration of a base, semiconductor layer, and protective layer, but may be configured without a semiconductor layer, that is, as a single plastic substrate.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosures of Japanese Patent Application No. 2018-079818, filed Apr. 18, 2018 and No. 2018-238069, filed Dec. 20, 2018 are expressly incorporated by reference herein.

What is claimed is:

1. An electronic timepiece comprising:
   a pivot;
   a dial through which the pivot passes and that transmits a light;

a radiating electrode through which the pivot passes;
an antenna including the radiating electrode; and
a solar panel through which the pivot passes and which is disposed between the dial and the radiating electrode,
the solar panel having a power generating part that converts light to electrical energy, and is disposed, in a plan view through the thickness direction of the dial, superimposed with the radiating electrode so that part of the outside circumference of the radiating electrode is outside the power generating part.

2. The electronic timepiece described in claim 1, wherein:
all of the outside circumference of the radiating electrode is positioned outside the power generating part in plan view.

3. The electronic timepiece described in claim 1, wherein:
the power generating part includes multiple solar cells; and
a boost converter boosts a voltage produced by the power generating part.

4. The electronic timepiece described in claim 1, wherein:
the antenna is a planar antenna.

5. An electronic timepiece comprising:
a pivot;
a dial that transmits a light through which the pivot passes;
an antenna having a radiating electrode through which the pivot passes; and
a solar panel through which the pivot passes and which is disposed between the dial and the radiating electrode,
the solar panel having a power generating part that converts light to electrical energy, and is disposed, in a plan view through the thickness direction of the dial, superimposed with the radiating electrode so that part of the outside circumference of the radiating electrode is outside the power generating part,
wherein the power generating part is a first power generating part positioned inside an outside circumference of the radiating electrode in plan view;
the solar panel has a second power generating part positioned outside the radiating electrode in plan view; and
the first power generating part and the second power generating part are connected by leads.

6. An electronic timepiece comprising:
a pivot;
a dial that transmits a light through which the pivot passes;
an antenna having a radiating electrode through which the pivot passes; and
a solar panel through which the pivot passes and which is disposed between the dial and the radiating electrode,
the solar panel having a power generating part that converts light to electrical energy, and is disposed, in a plan view through the thickness direction of the dial, superimposed with the radiating electrode so that part of the outside circumference of the radiating electrode is outside the power generating part,
wherein the antenna is an inverted-F antenna having a ground electrode separated from the radiating electrode, and a shorting element that shorts the radiating electrode and the ground electrode.

7. The electronic timepiece described in claim 6, further comprising:
a circuit board;
an electrode connecting the circuit board and the solar panel disposed outside the shorting element in plan view.

8. An electronic timepiece comprising:
a pivot;
a dial that transmits a light through which the pivot passes;
an antenna having a radiating electrode through which the pivot passes;
a solar panel through which the pivot passes and which is disposed between the dial and the radiating electrode;
an annular date indicator; and
a date indicator holder to which the radiating electrode is disposed and which holds the date indicator,
the solar panel having a power generating part that converts light to electrical energy, and is disposed, in a plan view through the thickness direction of the dial, superimposed with the radiating electrode so that part of the outside circumference of the radiating electrode is outside the power generating part.

9. The electronic timepiece described in claim 8, wherein:
the date indicator holder has an opening enabling viewing part of the date indicator.

* * * * *